(12) United States Patent
Ramakrishnan et al.

(10) Patent No.: US 7,672,842 B2
(45) Date of Patent: Mar. 2, 2010

(54) METHOD AND SYSTEM FOR FFT-BASED COMPANDING FOR AUTOMATIC SPEECH RECOGNITION

(75) Inventors: Bhiksha Ramakrishnan, Watertown, MA (US); Bent Schmidt-Nielsen, Lexington, MA (US); Lorenzo Turicchia, Cambridge, MA (US); Rahul Sarpeshkar, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 888 days.

(21) Appl. No.: 11/493,196

(22) Filed: Jul. 26, 2006

(65) Prior Publication Data

US 2008/0027708 A1 Jan. 31, 2008

(51) Int. Cl.
*G10L 19/02* (2006.01)
*G10L 21/00* (2006.01)
*G10L 15/00* (2006.01)
*H04B 15/00* (2006.01)

(52) U.S. Cl. .................. 704/230; 381/94.2; 704/231
(58) Field of Classification Search ................ 704/203, 704/231; 381/94.2
See application file for complete search history.

(56) References Cited

U.S. PATENT DOCUMENTS

| | | | | | |
|---|---|---|---|---|---|
| 4,025,723 | A | * | 5/1977 | Blackledge | 381/106 |
| 4,356,353 | A | * | 10/1982 | Eng et al. | 704/211 |
| 5,077,800 | A | * | 12/1991 | Dupret et al. | 381/316 |
| 5,133,013 | A | * | 7/1992 | Munday | 704/226 |
| 6,226,608 | B1 | * | 5/2001 | Fielder et al. | 704/229 |
| 6,327,648 | B1 | * | 12/2001 | Hedayat et al. | 712/35 |
| 2004/0252850 | A1 | * | 12/2004 | Turicchia et al. | 381/94.2 |

\* cited by examiner

*Primary Examiner*—David R Hudspeth
*Assistant Examiner*—Justin W Rider
(74) *Attorney, Agent, or Firm*—Dirk Brinkman; Gene Vinokur

(57) ABSTRACT

A method and system processes a speech signal. A fast Fourier transform is performed on a speech signal to produce a speech signal having a plurality of frequency bands in a frequency domain. For each frequency bands, filter the speech signal in the frequency domain with a spatial broadband filter, compress the broadband filtered speech signal, filter the compressed speech signal with a spatial narrowband filter; and, expand the narrowband filtered signal to an expanded signal

14 Claims, 5 Drawing Sheets

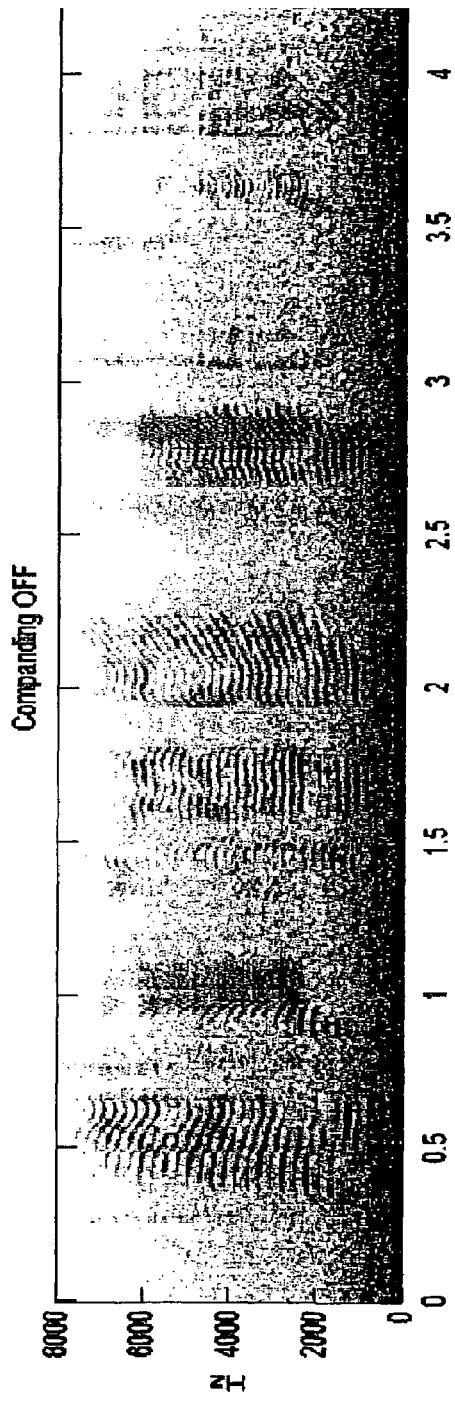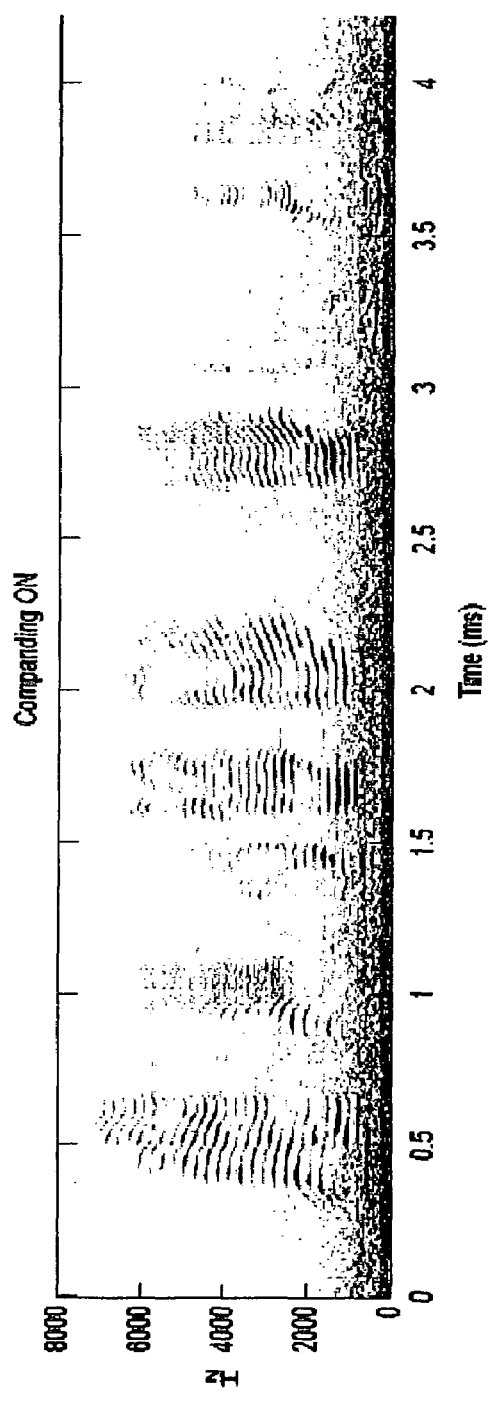

METHOD AND SYSTEM FOR FFT-BASED COMPANDING FOR AUTOMATIC SPEECH RECOGNITION

FIELD OF THE INVENTION

This invention relates generally to speech recognition, and more particularly to recognizing noisy speech by front end companding.

BACKGROUND OF THE INVENTION

Humans can easily recognize speech in a noisy environment. However, this task is difficult for automatic speech recognition (ASR) systems. One explanation is that the brain has complex acoustic pattern recognition capabilities. These capabilities are difficult to duplicate in ASR systems. The human peripheral auditory system has sophisticated signal representations, which can easily distinguish speech from noise. The cognitive processes that are brought to bear on human speech recognition tasks are not well understood and difficult to emulate.

The human peripheral auditory system has been well studied and several of the processes in it are well understood, and can be modeled. It may be expected that by simulating some of the processes in the peripheral auditory system within the signal processing schemes used by a speech recognizer, its ability to reduce noise may be improved.

The means by which the peripheral auditory system acquires acoustic pressure waves in a manner that can be forwarded to higher levels of the auditory pathway includes various processes that are analogous to automatic gain control, critical band analysis, equal loudness pre-emphasis, two tone suppression, forward and backward masking, half-wave rectification, and envelope detection.

Some ASR systems model the peripheral auditory system in detail using feature representations. Those systems perform at about the same level as ASR systems implemented with a Mel filter bank and cepstral analysis. However, the additional gains derived by feature representation are not commensurate with the greatly increased computation required by these models.

A more successful trend in anthropomorphic signal processing for speech recognition has been to model specific auditory phenomena, rather than the entire auditory process, for example, modeling critical band response in the computation of cepstral front ends for ASR. Critical band response is modeled in the signal processing schemes employed by almost all current ASR systems. The PLP features described by Hermansky incorporate equal-loudness preemphasis and root compression, H. Hermansky. "Perceptual linear predictive (PLP) analysis of speech." J. Acoust. Soc. Am. 87. pp 1738-1752, 1990.

The peripheral auditory system employs a variety of masking phenomena. Temporal masking is a phenomenon whereby high-energy sounds mask lower energy sounds immediately preceding or succeeding the lower energy sounds. Simultaneous masking is a phenomenon whereby high-energy frequencies mask out adjacent, concurrent, and lower-energy frequencies.

Computational analogues for temporal masking are described by B. Strope and A. Alwan, "A model of dynamic auditory perception and its application to robust word recognition," IEEE Trans. Speech Audio Processing, vol. 95, pp. 451-464, 1997, and M. Holmberg, D. Gelbart, W. Hemmert, "Automatic speech recognition with an adaptation model motivated by auditory processing," IEEE Trans. Speech Audio Process., vol. 14, no. 1, pp. 43-49, January 2006.

Other techniques compress and filter an effective envelope of an output of a critical-band filter bank, M. Holmberg, D. Gelbart, W. Hemmert, "Automatic speech recognition with an adaptation model motivated by auditory processing," IEEE Trans. Speech Audio Process., vol. 14, no. 1, pp. 43-49, January 2006, J. Tchorz and B. Kollmeier, "A model of auditory perception as front end for automatic speech recognition," J. Acoust. Soc. Am., vol. 106, pp. 2040-2050, 1999, and H. Hermansky and N. Morgan, "RASTA processing of speech", IEEE Trans. Speech and Audio Processing, vol. 2, no. 4, pp. 578-589, 1994. Those techniques have an incidental effect that high-energy sounds partially mask temporally adjacent low-energy acoustic phenomena.

Two-tone suppression is a nonlinear phenomenon observed in the cochlea. The presence of a first tone suppresses a frequency response of a second tone that is near to the first tone in frequency. This effect is likely to involve saturating amplification in the outer hair cells of the cochlea. At the psychoacoustic level, two-tone suppression manifests itself as simultaneous masking. Two tone suppression is defined by the American Standards Association (ASA) as the process by which the threshold of audibility for one sound is raised by the presence of another masking sound.

An analog device for spectral contrast enhancement in hearing aids is described by M. A. Stone and B. C. J. Moore, "Spectral feature enhancement for people with sensorineural hearing impairment: Effects on speech intelligibility and quality," in J. Rehabil Res. Dev., vol. 29, no. 2, pp. 39-56, 1992.

A digital spectral-contrast-enhancement process can yield a significant improvement of speech perception in noise with a digital spectral-contrast-enhancement algorithm in noise in hearing-impaired listeners, T. Baer, B. C. J. Moore, and S. Gatehouse, "Spectral contrast enhancement of speech in noise for listeners with sensorineural hearing impairment: Effects on intelligibility, quality, and response times," J. Rehabil Res. Dev., vol. 30, no. 1, pp. 49-72, 1993.

Similarly, a peak-isolation mechanism, based on raised-sine cepstral liftering, can enhance spectral contrast and benefit ASR, B. Strope and A. Alwan, "A model of dynamic auditory perception and its application to robust word recognition," IEEE Trans. Speech Audio Processing, vol. 95, pp. 451-464, 1997, and B. H. Juang, L. R. Rabiner, and J. G. Wilpon, "On the use of bandpass liftering in speech recognition," IEEE Trans. Acoust., Speech, Signal Processing, vol. 35, pp. 947-954, July 1987.

In general, ASR systems often improve recognition performance in "mismatched" conditions, i.e., the recognizer has been trained on clean speech, but the speech to be recognized is noisy. However, ASR systems do not improve performance when the training data are similar to the test data. This is a more realistic situation for most applications. Although ASR systems can obtain significant improvements for speech that has been corrupted by artificial digital noise, the ASR systems fail to deliver similar improvements on genuine noisy speech.

It is well known that the recognition performance obtained on noisy speech with systems that have been trained on noisy speech is generally better than that obtained on denoised noisy speech using systems that have been trained on clean speech, Hunt, M. J. "Some Experience in In-Car Speech Recognition." 1999 Proc. IEEE/Nokia Workshop on Robust Methods for Speech Recognition in Adverse Conditions, May 25-26, 1999.

A cochlear model with traveling-wave amplification and distributed gain control that exhibits two-tone suppression is described by L. Turicchia and R. Sarpeshkar, "The silicon cochlea: From biology to bionics," in Biophysics of the Cochlea: From Molecules to Models, A. W. Gummer, Ed. Singapore: World Scientific, 2003, pp. 417-423.

A companding process simply mimics tone-to-tone suppression and masking in the auditory system. Spectral-contrast enhancement results as a consequence, and perception in noise is improved. Other techniques that explicitly enhance spectral contrast in the signal has can improve speech recognition in the presence of noise.

A significant improvement in speech recognition accuracy can be obtained, particularly at very low SNRs, using digital simulation of the analog implementation of the companding process, J. Guiness, B. Raj, B. Nielsen, L. Turicchia, and R. Sarpeshkar, "A Companding Front End for Noise-Robust Automatic Speech Recognition," Proceedings of the IEEE International Conference on Acoustics, Speech, and Signal Processing (ICASSP '05), pp. 249-252, Mar. 18, 2005. Such an implementation, while suitable for implementation in low-power analog VLSI, is inefficient for a real-time recognizer that functions entirely on digitized signals.

A bio-inspired companding process that mimics two-tone suppression in a highly programmable filter-bank architecture is describe by L. Turicchia and R. Sarpeshkar, "A bio-inspired companding strategy for spectral enhancement," IEEE Trans. Speech Audio Proc. vol. 13, no. 2, pp. 243-253, March 2005. The companding process filters an incoming signal by a bank of broad filters, compresses the outputs of the filters by an estimated instantaneous RMS value, re-filters the compressed signals by a bank of narrow filters and finally expands them again by their instantaneous RMS values. This processing has the effect of retaining spectral peaks almost unchanged, whereas frequencies adjacent to spectral peaks are suppressed, resulting in two-tone suppression.

An emergent property of the companding process is that that the process enhances spectral contrast and naturally emphasizes high signal-to-noise (SNR) ratio spectral channels, while suppressing channels with a lower signal-to-noise ratio. The companding process significantly improves the intelligibility of the processed signal, both in simulations of cochlear implants, and for real cochlear implants, A. Bhattacharya and F.-G. Zeng, "Companding to improve cochlear implants' speech processing in noise," 2005 Conference on Implantable Auditory Prostheses, 2005, Y. W. Lee, S. Y. Kwon, Y. S. Ji, S. M. Lee, S. H. Hong, J. S. Lee, I. Y. Kim, "Speech Enhancement in Noise Environment Using Companding Strategy," 5th Asia Pacific Symposium on CI and related Sciences, Hong Kong, China, 2005, and P. C. Loizou, K. Kasturi, L. Turicchia, R. Sarpeshkar, M. Dorman and T. Spahr, "Evaluation of the companding and other strategies for noise reduction in cochlear implant," 2005 Conference on Implantable Auditory Prostheses, 2005.

SUMMARY OF THE INVENTION

The embodiments of the invention provide a method and system for fast Fourier transform (FFT) based companding of speech signals. The method mimics the tone-to-tone suppression and masking of the auditory system. The method improves the performance of automatic speech recognition (ASR) systems if the speech is noisy. In contrast with the prior art, the method is efficient and can be implementations due to its use of the FFT.

Furthermore, the conventional companding in the time domain incorporates time constants through which past sounds affect the spectrum of current sounds. In contrast, the FFT-based companding according to the invention is instantaneous within an analysis frame.

The method can improve a relative word error by 12.5% at −5 dB signal-to-noise ratio (SNR) for noisy speech, and by 6.2% across all SNRs (−5 dB SNR to +15 dB SNR).

BRIEF DESCRIPTION OF THE DRAWINGS

FIGS. 4A and 4B are narrow-band spectrograms of a speech signal before and after companding according to an embodiment of the invention.

DETAILED DESCRIPTION OF THE PREFERRED EMBODIMENT

FFT-Based Companding

The embodiments of our invention provide a method and system for fast Fourier transform (FFT) based companding of speech signals to be processed by an automated speech recognition (ASR) system. Our FFT-based companding method mimics two-tone suppression as described above. Performing the FFT greatly improves the processing efficiency of the companding system and method according to the embodiments of the invention, making the method and system practical for real-time ASR systems.

Companding

Figure 1A:
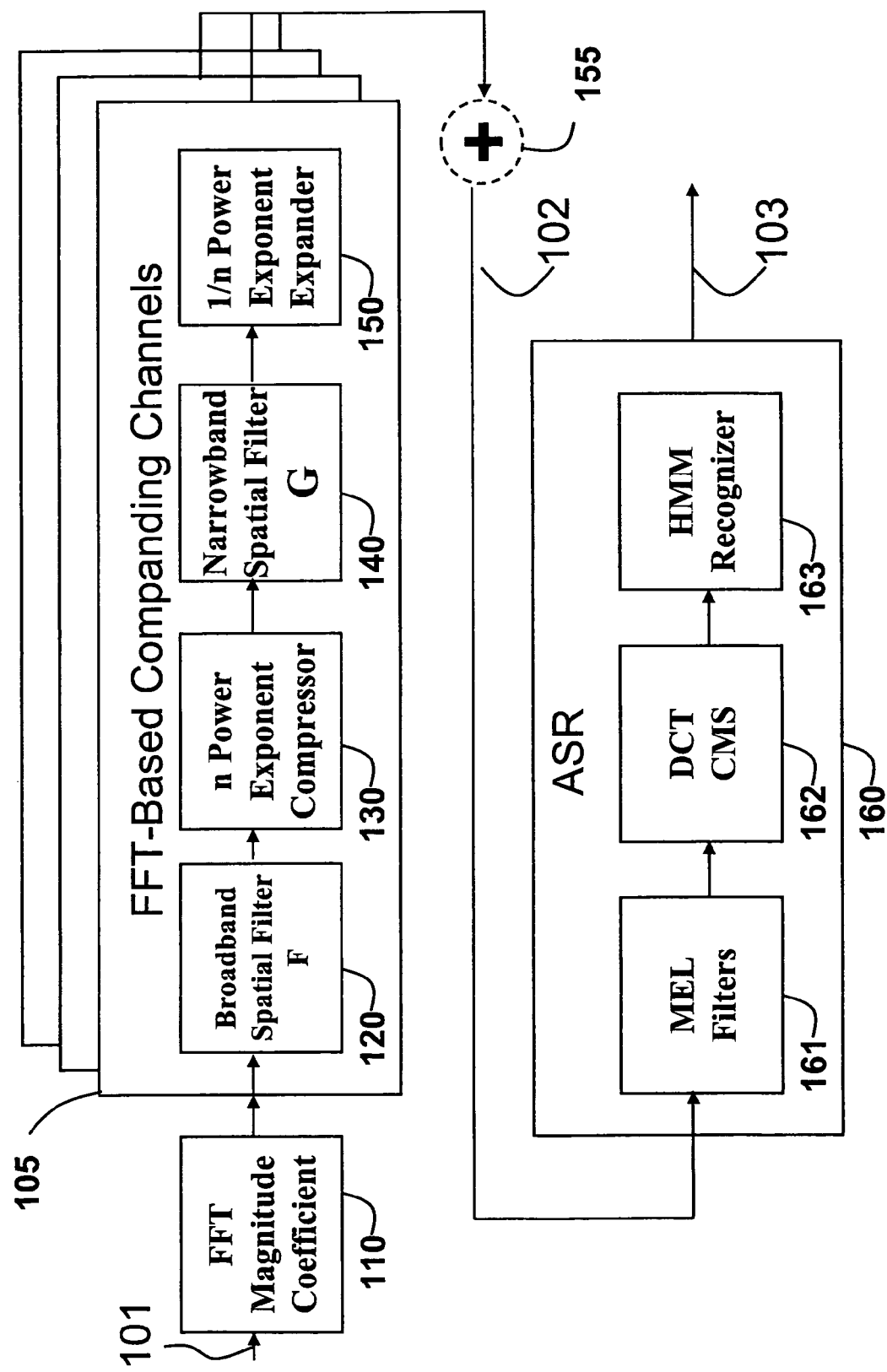
FIGS. 1A and 1B are block diagrams of a system and method for companding speech signals according to an embodiment of the invention.
Figure 1B:
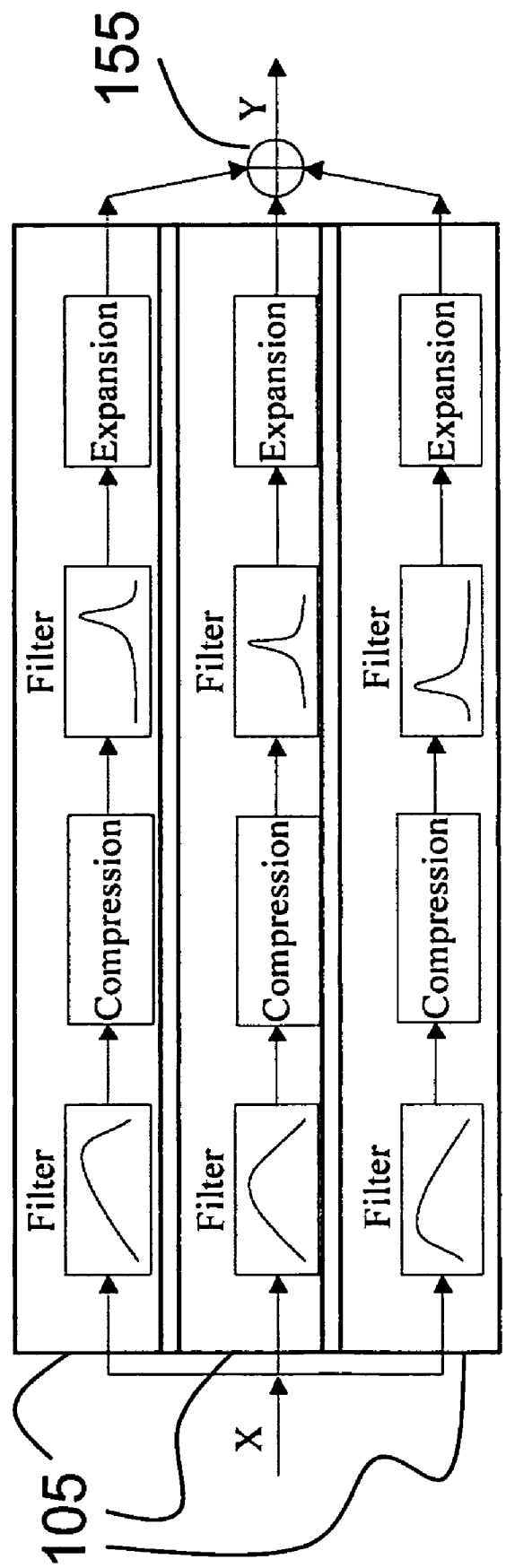

FIGS. 1A and 1B show a front end for an automated speech recognition (ASR) system 160. The front end includes a FFT block 110, multiple companding channels 105, and an optional adder 155.

Each channel 105 includes a broadband spatial filter 120 stage, an n power exponent compressor stage 130, a narrow-band spatial filter stage 140, and a 1/n power exponent expander stage 150 connected serially.

Input to the system is a speech signal 101. In the preferred embodiment, the speech signal is corrupted with noise. For example, the speech signal is acquired in a moving vehicle.

The input signal can be sampled at 8 or 16 KHz into overlapping analysis frames. Each analysis frame can include data from 25 ms of the input signal 101, and temporally adjacent frames are overlapped by 15 ms.

ASR

An ASR system 160 includes Mel filters 161, a discrete cosine transform (DCT) and cepstral mean subtraction (CMS) block 162, followed by a hidden Markov model (HMM) speech recognizer 163. The output of the system is recognized speech 103. The output can be in the form of text, phonemes, or lattice based speech representations, such as word lattices and phoneme lattices.

Companding Channels

The broadband filter, compressor, narrow band filter, and expander are implemented as multiple, non-coupled, parallel channels. There is one channel for one of a narrow frequency band that spans the frequencies found in speech signals. For example, there are nine equally spaced frequency bands.

Each channel includes the four serially connected stages: the wide band F filter 120, the compressor 130, the narrow-band G filter 140, and the expander 150. The outputs from channels can be combined (summed) 155 to yield an output signal 102 with enhanced spectral peaks. Alternately, the outputs can be used without summation, and features can be determined directly from the channel outputs.

The output signal can be provided to the automatic speech recognition system (ASR) 160. The wide band filter and the narrowband filters in every channel 105 have the same resonant frequency. The resonant frequencies of the various channels are equally spaced and span a desired spectral range, for example, the spectra of speech signals. The broadband filter 110 determines a set of frequencies for the channel that affects a gain of the compressor.

Figure 2:
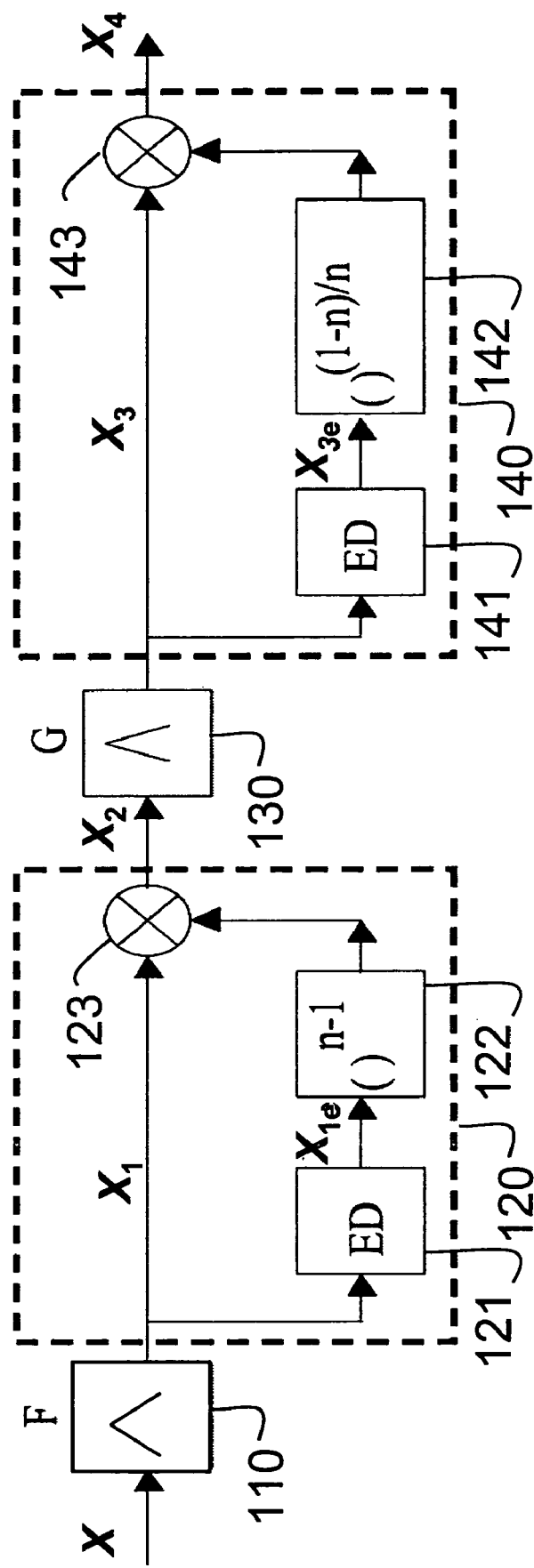
FIG. 2 is a block diagram a compressor of FIG. 1A.

As shown in FIG. 2, the compressor 130 includes an envelope detector (ED) 131, a nonlinearity block 132, and a multiplier 133. The output of the envelope detector $x_{1e}$, which we denote by AMP($X_1$), represents the amplitude $x_1$ of the output of the broadband filter. The nonlinearity raises the envelope of the signal to a power (n−1). As a result, the amplitude $X_2$, of the output of the multiplier, is approximately AMP($X_1$)$^n$. If n is lesser than 1, then this results in a compression of the output of the broadband filter.

The narrowband filter 140 selects only a narrower subset of the frequencies that are passed by the filter.

The expander 150 is similar to the compressor and also includes an envelope detector 151, a non-linearity block 152, and a multiplier 153. The output of the envelope detector $X_{3e}$ represents the amplitude of $X_3$, the output of the filter. The nonlinearity block raises the envelope of the signal to a power (1−n)/n. Consequently, the amplitude $x_4$, the output of the multiplier, is approximately AMP($X_3$)$^{1/n}$. If n is less than 1, then this result in an expansion of the output of the narrowband filter.

Consider the case where the input to a channel X is a first signal (primary tone) $\alpha \cos(\omega_1 t)$, at time t, with a resonant frequency $\omega_1$ for the channel. The broadband filter passes the unchanged, i.e. $X_1 = \alpha \cos(\omega_1 t)$, assuming a unit gain, zero phase filter, and $X_2 = \alpha^n \cos(\omega_1 t)$.

The narrowband filter has a resonant frequency identical to the broadband filter. Therefore, the narrowband filter also passes the signal. Hence, an amplitude of the output of the narrowband filter is the same as an amplitude of the output of the compressor, i.e. $X_3 = \alpha^n \cos(\omega_1 t)$.

An amplitude of the output of the channel $X_4$ is

AMP($X_3$)$^{1/n} = \alpha$, i.e., $X_4 = \alpha \cos(\omega_1 t)$.

The channel has no effect on the overall level of an isolated tone at the resonant frequency.

Now, consider the case where the input to the channel is a sum of a first signal (primary tone) at the resonant frequency $\omega_1$ of the channel, and a second signal with a higher energy at an adjacent frequency $\omega_2$, such that $\omega_2$ lies within the bandwidth of the broadband filter, but outside that of the narrowband filter, i.e., $X = \alpha \cos(\omega_1 t) + k\alpha \cos(\omega_2 t)$, where the amplitude of the second signal is k times that of the first tone.

If the broadband filter passes both signal without modification, then $X_1 \cup \alpha \cos(\omega_1 t) + k\alpha \cos(\omega_2 t)$.

As an extreme case, we consider k≫1. The amplitude of $X_1$ is approximately kα, and $X_2 \cup k^{(n-1)} \alpha^n \cos(\omega_1 t) + k^n \alpha^n \cos(\omega_2 t)$.

The narrow-band filter does not pass the second signal at the adjacent frequency $\omega_2$, hence $x_3 = k^{(n-1)} \alpha^n \cos(\omega_1 t)$.

The expander expands the signal by an amplitude of $x_3$, leading to $X_4 = k^{(n-1)/n} \alpha \cos(\omega_1 t)$, i.e., the output of the channel is the first signal at the resonant frequency, scaled by a factor $k^{(n-1)/n}$. Because k>1 and n<1, $k^{(n-1)/n}<1$, i.e., the companding results in a suppression of the signal at the center frequency of the channel. The greater the energy of the second signal with the frequency $\omega_2$, i.e., the larger the value of k is, and the greater the suppression of the signal at the center frequency.

More generally, the process results in the enhancement of spectral peaks at the expense of signal at adjacent frequencies. Any sufficiently intense frequencies outside the range of the narrowband filter, but within the range of the broadband filter, set a conservatively low gain in the compressor and are filtered out by the narrowband filter. In this case, the gain of the compressor is set by one set of frequencies, while the gain of the expander gain is set by another set of frequencies, such that the gain in the expander does no undo the effect of the compressor.

The net effect is that there is overall suppression of weak narrowband signal in a channel by strong out-of-band signal. Note that these out-of-band signals in one channel are dominant signals in a neighboring channel where the signals are resonant.

Figure 3:
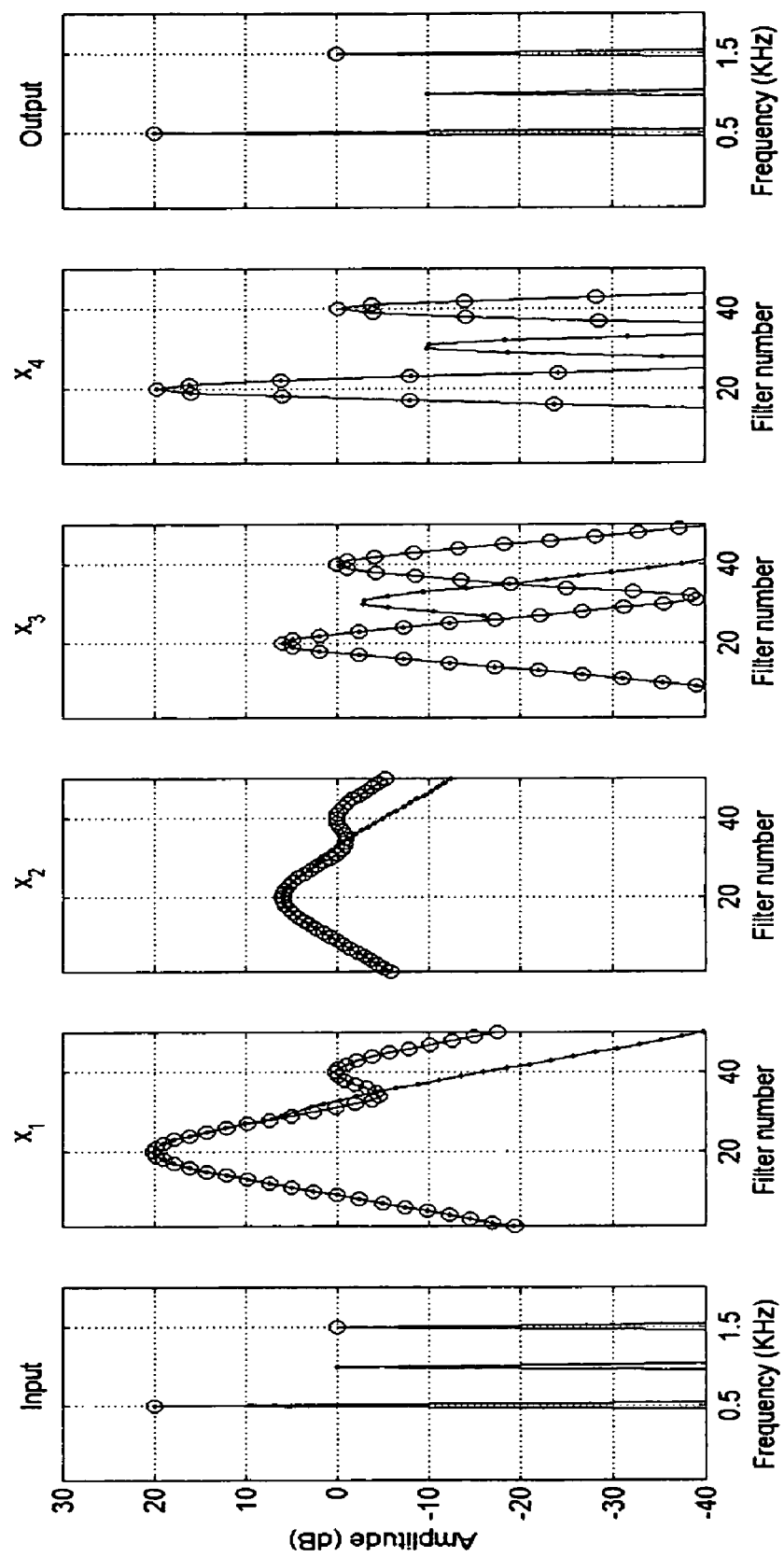
FIG. 3 are graphs of outputs at various stages of a channel for a mixture of three tones according to an embodiment of the invention.

FIG. 3 shows the outputs at various stages of a channel for a mixture of three tones. Consequently, the output spectrum of the filter bank has a local 'winner-take-all' like characteristic. Effectively, strong spectral peaks in the input signal suppress or mask weaker neighboring signal, and signals with high signal-to-noise (SNR) ratios are emphasized over signals with low SNR ratios.

FFT-Based Companding

The prior art companding is suited for low-power analog circuit implementations. However, a straightforward digital implementation of the prior art companding is computationally intensive.

Therefore, we describe a computationally efficient digital implementation of the companding based on the fast Fourier transform (FFT).

FIG. 2 shows the details of processing the signals in a single channel in the frequency domain. A FFT of the input speech signal 101 over an analysis frame is represented by X. Herein, upper case letters always refers to signals in the frequency domain. In our representation X is a column vector with as many elements as the number of unique frequency bands in the frequency domain.

The Fourier spectrum of the filter response of the broadband filter in the $i^{th}$ channel is a vector $F_i$. The spectrum of the output signal $X_i$ of the broadband filter is given by $X_{i,1} = F_i \otimes X$, where $\otimes$ represents a element-wise Hadamard multiplication. Note that the i in $X_{i,1}$ denotes the $i^{th}$ spectral channel, while the 1 denotes that it corresponds to the signal $X_1$ in the first channel.

The ED block extracts the RMS value of the input such that $X_{i,1e} = |X_{i,1}|$, where the |.| operator represents the Euclidean norm of a vector. We also assume that the output of the ED is constant over the duration of the analysis frame. However, output can change frame-to-frame. The output of the envelope detector, a scalar over the duration of the frame, is raised to the power n−1 and multiplied by $X_{i,1}$. The spectrum of the output of the multiplier is therefore given by $X_{i,2} = |X_{i,1}|^{n-1} X_{i,1}$.

The FFT of the impulse response of the narrowband filter in the $i^{th}$ channel is $G_i$. The spectrum of the output of the narrowband filter is given by $$X_{i,3} = G_i \otimes X_{i,2}$$
$$= |X_{i,1}|^{n-1} G_i \otimes X_{i,1}$$
$$= |F_i \otimes X|^{n-1} G_i \otimes F_i \otimes X.$$

We define a filter $H_i$ that is a the combination of the $F_i$ and $G_i$ filters:

$$H_i = F_i \otimes G_i = G_i \otimes F_i.$$

Therefore, we can write $$X_{i,3} = |F_i \otimes X|^{n-1} H_i \otimes X.$$

The second ED block determines the RMS value of $X_{i,3}$, i.e., $$X_{i,3e} = |F_i \otimes X|^{n-1} |H_i \otimes X|.$$

The output of the second ED block is constant during the time of analysis of a frame. The output of the ED block is raised to a power $(1-n)/n$, and multiplied by $X_{i,3}$, the output of the narrow band filter. The spectrum of the output of the second multiplier is given by $$X_{i,4} = |X_{i,3e}|^{(1-n)/n} X_{i,3}$$
$$= (|F_i \otimes X|^{n-1} |H_i \otimes X|)^{(1-n)/n} |F_i \otimes X|^{n-1} H_i \otimes X$$
$$= |F_i \otimes X|^{(n-1)/n} |H_i \otimes X|^{(1-n)/n} H_i \otimes X$$

In one embodiment, the outputs of all the channels are summed 155. A spectrum of the summed signal is a sum of the spectra from the individual channels. Hence, the spectrum of the companded signal 102 is given by $$Y = \sum_i X_{i,4}$$
$$= \sum_i |F_i \otimes X|^{(n-1)/n} |H_i \otimes X|^{(1-n)/n} H_i \otimes X$$
$$= \left( \sum_i |F_i \otimes X|^{(n-1)/n} |H_i \otimes X|^{(1-n)/n} H_i \right) \otimes X.$$

The above formulation is a combination of Hadamard multiplications, exponentiation and summation and that can be performed very efficiently. Note that by introducing a term $J(X)$ such that $$J(X) = \sum_i |F_i \otimes X|^{(n-1)/n} |H_i \otimes X|^{(1-n)/n} H_i,$$

we can write $$Y = J(X) \otimes X.$$

It is clear from the above formulation that the effect of the companding is to filter the frequency domain signal X by a filter that is a function of the signal X itself. It is this non-linear operation that results in the desired enhancement of spectral contrast.

Mel-frequency spectral vectors are determined by multiplying Y by a matrix of Mel filters M:

$$Y_{mel} = MY$$

The companding method according to the invention has several parameters that can be adjusted to optimize speech recognition performance, namely the number of channels in the filter bank, the spacing of the center frequencies of the channels, the design of the broadband filters (the F filters) and the narrow-band filters (the G filters), and the companding factor n.

In the prior art companding method, the center frequencies of the F and G filters were spaced logarithmically.

In contrast, the FFT-based companding method according to an embodiment of the invention, the filters are spaced linearly. In this embodiment, the filter bank has as many filters as the number of frequency bands in the FFT. The frequency response of the broadband filters (the F filters), and the narrowband filters (the G filters) have a triangular shape. The G filters are much narrower than the F filters. The width of the F filters represents a spectral neighborhood that affects the masking of any frequency. The width of the G filters determines the selectivity of the masking.

The optimal values of the width of the F and G filters and the degree of companding n are determined by experimentation. The best performance is obtained with F filters that spanned 9 frequency bands of a 512-point FFT of the signal, and G filters span one frequency band. The optimal value of n is 0.35.

FIGS. 4A and 4B shows the narrow-band spectrogram plot for the sentence "three oh three four nine nine nine two three two" spoken in the noisy environment of a moving vehicle. The energy in any time-frequency component is represented by a grey scale, i.e., the darker, the greater the energy.

FIG. 4A shows the spectrogram before companding, and FIG. 4B the lot after companding to achieve simultaneous masking on the signal. It is evident from FIG. 4B that is able to follow harmonic and formant transitions with clarity and suppress the surrounding clutter. In contrast, FIG. 4A shows that in the absence of companding, the formant transitions are less clear especially at low frequencies where the noise is high.

EFFECT OF THE INVENTION

The embodiments of the invention provide a biologically-motivated signal-processing method and system that effects simultaneous masking of speech spectra via the mechanism of two-tone suppression. Cepstral features derived from spectra enhanced in this manner result in significantly superior automatic speech recognition performance, compared to conventional Mel-frequency cepstra.

In an application of recognizing speech signals acquired in a moving vehicle, the relative word error is improved by 12.5% at −5 dB signal-to-noise Ratio (SNR), and by 6.2% across all SNRs (−5 dB SNR to +15 dB SNR). These improvements are often substantial.

In the quest for a perfect biologically inspired signal processing scheme for noise-robust speech recognition, it is important to be able to distinguish psycho-acoustic phenomena that are relevant to the problem from those that are simply incidental. The methods described above reproduces simultaneous masking to an extent that speech recognition is significantly improved.

Significantly, the embodiments of the invention described herein are not a direct transliteration of conventional companding processes. Rather, the invention uses FFT-based companding that is intended to be more efficient and amenable to incorporation in an automatic speech recognition system than the conventional companding operating in the time domain.

The FFT-based implementation varies significantly from the conventional analog design. For instance, the conventional companding] incorporates time constants through which past sounds affect the spectrum of current sounds. The FFT-based companding according to the invention is instantaneous within an analysis frame.

The F and G filters can be triangular. However, biologically-correct filters, e.g., asymmetric filters that resemble typical masking curves measured in humans, can also be used.

It is to be understood that various other adaptations and modifications may be made within the spirit and scope of the invention. Therefore, it is the object of the appended claims to cover all such variations and modifications as come within the true spirit and scope of the invention.

The invention claimed is:

1. A method for processing a speech signal, comprising the steps of:
    performing a fast Fourier transform on a speech signal to produce a speech signal having a plurality of frequency bands in a frequency domain, and for each frequency bands further comprising the steps of:
    filtering the speech signal in the frequency domain with a spatial broadband filter;
    compressing the broadband filtered speech signal;
    filtering the compressed speech signal with a spatial narrowband filter; and
    expanding the narrowband filtered signal to an expanded signal.

2. The method of claim 1, in which the speech signal includes noise of an environment in which the speech signal is acquired.

3. The method of claim 1, in which the speech signal is sampled into a plurality of overlapping frames, and the broadband filtering, compressing, narrowband filtering, and expanding is performed individually on the plurality of frames.

4. The method of claim 1, further comprising:
    summing the expanded signals into a summed speech signal; and
    recognizing the summed speech signal by an automatic speech recognizer.

5. The method of claim 1, in which the plurality of frequency bands are equally spaced.

6. The method of claim 1, in which cepstral features are determined directly from the expanded signal.

7. The method of claim 1, in which the broadband filter and the narrowband filter are linear.

8. The method of claim 1, in which a Fourier spectrum of a response of the broadband filter is a vector F, and a spectrum of the broadband filtered signal is $X_1 = F \otimes X$, where $\otimes$ represents an element-wise Hadamard multiplication, and X is the speech signal, and $X_1$ is the broad band filtered signal, and in which the expanding produces the expanded signal $X_2 = |X_1|^{n-1} X_1$, where n is a constant companding factor.

9. The method of claim 8, in which a Fourier spectrum response of the narrowband filter is a vector G, and a spectrum of the narrowband filtered signal $X_3$ is $$X_3 = G \otimes X_2.$$

10. The method of claim 9, in which a filter H is $F \otimes G$, and $$X_3 = |F \otimes X|^{n-1} H \otimes X.$$

11. The method of claim 10, in which the expanded signal is $$X_4 = |F \otimes X|^{(n-1)/n} |H \otimes X|^{(1-n/n)} H \otimes X.$$

12. The method of claim 11, in which the summed signal is $$J(X) = \Sigma |F \otimes X|^{(n-1)/n} |H \otimes X|^{(1-n/n)} H \otimes X.$$

13. The method of claim 12, in which an integral spectrum is computed as $$Y = J(X) \otimes X.$$

14. The method of claim 13, in which a Mel-frequency spectral vector is determined as $$Y_{mel} = MY.$$

* * * * *